United States Patent
Naikal et al.

(10) Patent No.: US 11,004,224 B2
(45) Date of Patent: May 11, 2021

(54) GENERATION OF STRUCTURED MAP DATA FROM VEHICLE SENSORS AND CAMERA ARRAYS

(71) Applicant: VELODYNE LIDAR USA, INC., San Jose, CA (US)

(72) Inventors: Nikhil Naikal, San Francisco, CA (US); Alonso Patron-Perez, Elkins Park, PA (US); Alexander Marques, San Francisco, CA (US); John Kua, San Francisco, CA (US); Aaron Matthew Bestick, San Francisco, CA (US); Christopher D. Thompson, Alexandria, VA (US); Andrei Claudiu Cosma, Emeryville, CA (US)

(73) Assignee: VELODYNE LIDAR USA, INC., San Jose, CA (US)

( * ) Notice: Subject to any disclaimer, the term of this patent is extended or adjusted under 35 U.S.C. 154(b) by 16 days.

(21) Appl. No.: 16/254,508

(22) Filed: Jan. 22, 2019

(65) Prior Publication Data

US 2020/0234459 A1    Jul. 23, 2020

(51) Int. Cl.
*G06T 7/579*    (2017.01)
*G06T 7/73*     (2017.01)

(52) U.S. Cl.
CPC ............... *G06T 7/579* (2017.01); *G06T 7/74* (2017.01); *G06T 2207/10016* (2013.01)

(58) Field of Classification Search
CPC .. G06T 7/579; G06T 7/74; G06T 2207/10016
USPC ........................................................ 382/106
See application file for complete search history.

(56) References Cited

U.S. PATENT DOCUMENTS

| | | | |
|---|---|---|---|
| 2007/0070069 A1* | 3/2007 | Samarasekera | G06F 16/748 345/427 |
| 2010/0204974 A1* | 8/2010 | Israelsen | G01S 17/86 703/17 |
| 2018/0157328 A1* | 6/2018 | Brunner | G06F 3/0304 |

OTHER PUBLICATIONS

Yokoyama, "Secure Positioning in a UAV Swarm using On-board Stereo Cameras". Mar. 31, 2014.*

* cited by examiner

*Primary Examiner* — Juan A Torres
(74) *Attorney, Agent, or Firm* — Goodwin Procter LLP

(57) ABSTRACT

Motion and video data from vehicle sensors and camera arrays attached to a vehicle collect video and sensor data along a path driven by the vehicle. A system processes such data to produce high-accuracy structured map data, as might be used to precisely locate a moving vehicle in its environment. Positions are calculated from the sensor data. The positions are updated based on the video data. When loops in the vehicle path are detected, a loop closure error is calculated and used to update the positions as well as to reduce bias in the sensors when calculating future positions. Positions of features in the video are used to create or update structured map data.

20 Claims, 3 Drawing Sheets

GENERATION OF STRUCTURED MAP DATA FROM VEHICLE SENSORS AND CAMERA ARRAYS

FIELD OF THE INVENTION

The present disclosure generally relates to the generation of structured map data from sensor and other inputs into a form usable for various machine and human mapping tasks. The present disclosure more particularly relates to apparatus and techniques for generating motion and video data from vehicle sensors and camera arrays and processing such data to produce high-accuracy structured map data, as might be used to precisely locate a moving vehicle in its environment.

BACKGROUND

As technology for autonomous and semi-autonomous vehicles advances, there is a need for machine-readable maps encoded in map data structures that enable locating the vehicle in its environment with enough accuracy and precision to allow, for example, a vehicle to stay in its lane or avoid hitting a curb or road obstruction. Such precision might be within centimeters. Commercial Global Positioning Systems (GPS) do not provide such accuracy and are often unavailable in moments of need, and maps meant for human use do not provide the type of terrain data that a vehicle would need to navigate (e.g., location of curbs). Map data structures meant for vehicular navigation, as opposed maps for human navigation, provide rich data about stationary objects to allow a vehicle to avoid hitting objects and to allow the vehicle to obtain its position from stationary objects.

One approach to generating such map data is to equip a vehicle with a commercial LIDAR array, but such systems can be expensive. Features near and on a road can change, for example due to roadwork. Because LIDAR systems are expensive, it is often not economical to have map data frequently updated, except possibly for the most heavily traveled roads, leaving map data typically out of date.

There is a need for a less expensive source of vehicular map data. As more map data is produced, this creates a need for an automated method of processing the map data.

SUMMARY

Apparatus and methods for collecting sensor data processing such data to produce high-accuracy structured map data is provided. The processing can occur on a sensor device operating in or on a vehicle, on a computing device coupled to the sensor device, at a remote server, or some combination of those. The high-accuracy structured map data might be generated with a minimum of human interaction and from sensor data from inexpensive sensors. The high-accuracy structured map data might be generated in a form usable for autonomous driving systems and other systems needing data related to an environment, such as an outdoor region of city streets or other environments.

A method of generating structured map data might include receiving time-stamped sensor data from at least one sensor mounted on a vehicle, receiving time-stamped video data comprising at least two video streams, each video stream produced by a camera of at least two cameras mounted on the vehicle, and, from the time-stamped sensor data, computing a plurality of spatial reading values, each spatial reading value comprising a position and an associated time stamp, such that the position indicates a position at which the at least one sensor was deemed to be during a time indicated by the associated timestamp. The plurality of spatial reading values might include a first spatial reading value, comprising a position p0 and a time t0, and a second spatial reading value, comprising a position p1 and a time t1. From the time-stamped video data, a system may compute, using a processor, a plurality of image records for each of the at least two video streams, each image record comprising an image and an associated time stamp, such that the image is deemed to have been recorded at the associated time stamp. The system may further identify, using a processor, two t0 image records, each t0 image record selected from one of the plurality of image records for each of the at least two video streams, such that each image record of the at least two t0 image records has an associated time stamp approximately equal to t0. The system may system may further identify, using a processor, at least two t1 image records, each t1 image record selected from one of the plurality of image records for each of the at least two video streams, such that each image record of the at least two t1 image records has an associated time stamp approximately equal to t1. The system may then identify, using a processor, a fixed feature present in each of the at least two t0 image records and in the at least two t1 image records and calculate a t0 relative feature position of the fixed feature at time t0 based on a parallax difference between the at least two t0 image records. The system may further calculate a t1 relative feature position of the fixed feature at time t1 based on a parallax difference between the at least two t1 image records and, based on a difference between the t0 relative feature position and the t1 relative feature position, determine an adjustment to p1.

The method might also include using a processor to identify a plurality of fixed features in the image records. For each of the plurality of fixed features, a system may calculate at least one relative feature position of the fixed feature based on at least two image records to produce a plurality of relative features positions. The system may produce a plurality of adjustments by determining an adjustment to the position of each spatial reading value of the plurality of spatial reading values based on the plurality of relative feature positions and apply the plurality of adjustments to the position of each spatial reading value of the plurality of spatial reading values to produce a plurality of adjusted spatial reading values. The system may detect a later position of the plurality of adjusted spatial reading values is within a maximum loop closure distance of a prior position of the plurality of adjusted spatial reading values, the later position and prior position separated by one of a smallest loop time and a smallest loop distance, the later position associated with a later time stamp and the prior position associated with a prior time stamp. The system may then calculate a loop closure error from a first image record, of the plurality of image records, having an associated time stamp approximately equal to the prior time stamp and a second image record having an associated time stamp approximately equal to the later time stamp.

The method might also include using the loop closure error to calculate a further adjustment to the plurality of adjusted spatial reading values. The time-stamped sensor data may comprise data from an accelerometer mounted in the vehicle and a time stamp is applied to the sensor data using a timing signal from a Global Positioning System. In some embodiments of the method, at least two cameras may be mounted in a camera array mounted on the vehicle.

In another embodiment, a method of generating structured map data might include receiving time-stamped sensor data from at least one sensor mounted on a vehicle, receiving time-stamped video data comprising at least two video streams, each video stream produced by a camera of at least two cameras mounted on the vehicle, and from the time-stamped sensor data, computing a plurality of spatial reading values. Each spatial reading value might include a position and an associated time stamp, such that the position indicates a position at which the at least one sensor was deemed to be during a time indicated by the associated timestamp. From the time-stamped video data, a system may compute, with a processor a plurality of image records for each of the at least two video streams, each image record comprising an image and an associated time stamp, such that the image is deemed to have been recorded at the associated time stamp. The system might use a processor to identify a plurality of feature image records associated with a feature, the feature image records being a subset of the plurality of image records such that each image in each image record contains the feature. A plurality of relative feature positions might be calculated by calculating a relative feature position from each image in the feature image records. The system may produce a point cloud comprising a plurality of positions for the feature based on the plurality of relative feature positions.

The method might also calculate a probabilistic position of the feature from the point cloud, with an accuracy of the probabilistic position improving as more time-stamped video data containing the feature is collected. The probabilistic position of a feature may be compared to historical map data to determine if the feature is stationary and then used to update historical map data.

The method might also use a processor to identify at least two t0 image records, each t0 image record selected from one of the plurality of image records for each of the at least two video streams, such that each image record of the at least two t0 image records has an associated time stamp approximately equal to t0. A processor may then be used to identify at least two t1 image records, each t1 image record selected from one of the plurality of image records for each of the at least two video streams, such that each image record of the at least two t1 image records has an associated time stamp approximately equal to t1. A fixed feature present in each of the at least two t0 image records and in the at least two t1 image records may be identified. A t0 relative feature position of the fixed feature at time t0 may be calculated based on a parallax difference between the at least two t0 image records. A t1 relative feature position of the fixed feature at time t1 may also be calculated based on a parallax difference between the at least two t1 image records and, based on a difference between the t0 relative feature position and the t1 relative feature position, an adjustment to p1 may be determined.

The method might also include producing a plurality of adjustments by determining an adjustment to the position of each spatial reading value of the plurality of spatial reading values, the plurality of adjustments based on a plurality of relative feature positions of a plurality of fixed features identified, using a processor, in the image records. The plurality of adjustments may be applied to the position of each spatial reading value of the plurality of spatial reading values to produce a plurality of adjusted spatial reading values. A later position of the plurality of adjusted spatial reading values may be detected as within a maximum loop closure distance of a prior position of the plurality of adjusted spatial reading values, the later position and prior position separated by one of a smallest loop time and a smallest loop distance. A loop closure error may be calculated from the time stamped video data based on the later position, the time stamp associated with the later position, the prior position, and the time stamp of the prior position.

The loop closure error may be used to calculate an adjustment for at least one position in the point cloud. The time-stamped sensor data may include data from Inertial Measurement Unit mounted in the vehicle and a time-stamp from a Global Positioning System mounted in the vehicle A system for generating structured map data might include a vehicle having a time source, sensors which collect sensor data, and an array of at least two cameras each of which produce a video stream, wherein time stamps from the time source are applied to the sensor data to produce time-stamped sensor data and to each video stream to produce time-stamped video data. A sensor data processing system may receive the time-stamped sensor data and time-stamped video data and perform the following series of steps. From the time-stamped sensor data, the system might compute a plurality of spatial reading values, each spatial reading value comprising a position and an associated time stamp, such that the position indicates a position at which the at least one sensor was deemed to be during a time indicated by the associated timestamp, the plurality of spatial reading values including a first spatial reading value, comprising a position p0 and a time t0, and a second spatial reading value, comprising a position p1 and a time t1. From the time-stamped video data, the system may compute a plurality of image records for each of the at least two video streams, each image record comprising an image and an associated time stamp, such that the image is deemed to have been recorded at the associated time stamp. The system may use a processor to identify at least two t0 image records, each t0 image record selected from one of the plurality of image records for each of the at least two video streams, such that each image record of the at least two t0 image records has an associated time stamp approximately equal to t0. The system may then use a processor to identify at least two t1 image records, each t1 image record selected from one of the plurality of image records for each of the at least two video streams, such that each image record of the at least two t1 image records has an associated time stamp approximately equal to t1. The system may use a processor to identify a fixed feature present in each of the at least two t0 image records and in the at least two t1 image records. The system may then calculate a t0 relative feature position of the fixed feature at time t0 based on a parallax difference between the at least two t0 image records and then calculate a t1 relative feature position of the fixed feature at time t1 based on a parallax difference between the at least two t1 image records. Based on a difference between the t0 relative feature position and the t1 relative feature position, the system may determine an adjustment to p1.

The sensor data processing of the system may further produce a plurality of adjustments by determining an adjustment to the position of each spatial reading value of the plurality of spatial reading values, the plurality of adjustments based on a plurality of relative feature positions of a plurality of fixed features identified, using the processor, in the image records. The sensor data processing may further apply the plurality of adjustments to the position of each spatial reading value of the plurality of spatial reading values to produce a plurality of adjusted spatial reading values. The sensor data processing may further detect a later position of the plurality of adjusted spatial reading values is within a maximum loop closure distance of a prior position of the plurality of adjusted spatial reading values, the later position and prior position separated by one of a smallest loop time and a smallest loop distance. The sensor data processing may calculate a loop closure error from the time stamped video data based on the later position, the time stamp associated with the later position, the prior position, and the time stamp of the prior position.

The system use the loop closure error to calculate a further adjustment to the plurality of adjusted spatial reading values.

The sensor data processing of the system may further use the processor to identify a plurality of feature image records associated with a feature, the feature image records being a subset of the plurality of image records such that, for each time stamp in the feature image records, at least one image associated with the time stamp contains the feature. The sensor data processing may further calculate a plurality of relative feature positions by calculating a relative feature position from each image in the feature image records and produce a point cloud comprising a plurality of positions for the feature based on the plurality of relative feature positions.

The system may calculate a probabilistic position of the feature from the point cloud, with an accuracy of the probabilistic position improving as more time-stamped video data containing the feature is collected. The probabilistic position of a feature may be compared to historical map data to determine if the feature is stationary.

The sensors which collect sensor data may include an accelerometer and a gyroscope and the time source is a Global Positioning System.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which.

DETAILED DESCRIPTION

Figure 1:
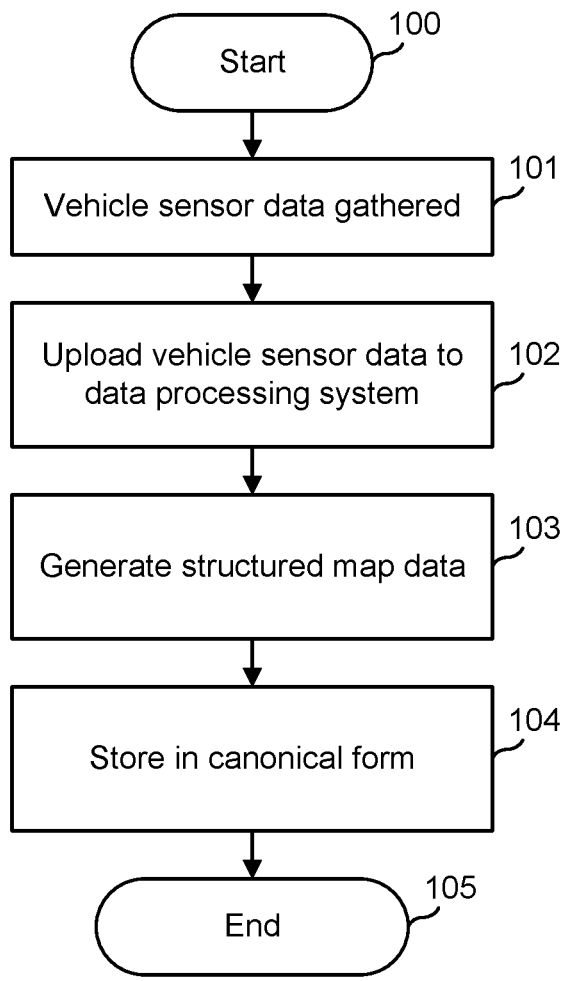
FIG. 1 shows a method in accordance with one embodiment.

In the following detailed description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Some methods and apparatus described and suggested herein provide for (1) generating raw vehicle sensor data, (2) processing the vehicle sensor data to produce structured map data, and (3) comparison of the new structured map data with historical map data. These processes might be used to produce structured map data. After the structured map data is produced, it may be translated or otherwise processed to fit a particular use case or customer of the map data. In one embodiment, these processes are performed sequentially, with the raw vehicle sensor data being gathered and stored onboard the vehicle, but the methods are not so limited. Simultaneous collection and transmission (e.g., cellular data transmission) is possible, as is automated processing onboard the vehicle.

Although the disclosure is made with respect to vehicles such as automobiles, those skilled in the art will recognize that the methods are not so limited and may be used, for example, to construct structured map data for aerial vehicles or submersible vehicles. The disclosure also refers to collection using video cameras, which may be adapted for the use of, as an example, sonar (sound navigation and ranging). Though one embodiment uses video cameras to avoid the expense of LIDAR, and for other reasons, some of the methods and techniques apply to processing sensor data equally to data gathered using LIDAR, radar, or other sensors.

As used herein, "sensor data" refers to data that can be represented electronically and/or in a computer-readable form that corresponds to signals detected by sensors. Examples include video cameras, still cameras, light sensors, distance sensors, gyroscopes, accelerometers, compass detectors, level detectors, voltage sensors, current sensors, and the like. Typically, the signals from these sensors are digitized and then can be stored in computer memory or transmitted over digital data transfer channels as might exist between a device mounted in or on a vehicle to a smartphone or other computing device located nearby or as might exist between the device and/or the computing device and a remote server or device, for example as provided by a cellular telephone channel.

Cameras generally are able to capture an electronic representation of light impinging on a camera sensor, in order to capture an image of a scene generally in front of the camera (in the case of a directional camera) or in view of the camera (for omnidirectional cameras). If an image is taken at a single point in time, that can be a still image and if images are captured in a sequence over time, this can be represented by a video sequence (for brevity, often referred to just as "video") that can be stored as stored video, or transmitted or streamed as a video stream, etc.

Cameras thus capture imagery (still images, video, etc.) of a scene where the camera is directed or located. The scene captured can be part of an environment in which the camera is operating. In one example, a camera is mounted on a vehicle and faces forward while the vehicle is traveling around a city or other geographic location, and the camera captures imagery of a scene in front of the vehicle (and perhaps the sides and even behind, in the case of a 360 degree camera). Typically, a simple camera has a single camera sensor for capturing a two-dimensional (2D) view of the scene and multiple such cameras can be used and spaced apart to add a depth perception component.

Some sensors sense vehicle motion. These sensors might include gyroscopes, accelerometers, compasses and the like. The outputs of these vehicle motion sensors produce vehicle motion data and might be used in processing and/or recorded, along with data obtained from a vehicle control and management computer system (e.g., speedometer or engine parameters) often available from an on-board diagnostic system.

Vehicle location sensors can include sensors such as GPS devices, differential GPS devices, cellular position data sensors, Galileo devices, GLONASS devices, other satellite-based location systems, and proprietary radio-based systems. These sensors generate vehicle location data, but are generally not high enough accuracy for producing structured map data for vehicles to navigate. Vehicle sensor data refers collectively to vehicle motion data, vehicle location data, vehicle image data, and possibly other data.

The city or other geographic location where the vehicle is driving would be the environment from which the scene is captured. The scene might include salient features, such as other cars, lane markings, other street markings, signs, curbs, pedestrians, animals, sky, rain, and other elements present in that environment. Some of those elements might be moving relative to the roadway while others are stationary. Some may appear stationary during a video capture period but in fact are movable and move at other times.

Path features, or just features, are detected by sensors as being suitable for detection due to, for example, edges or prominence with respect to a background. Fixed features are features that have a high probability of being fixed based on size, shape, or location. For example, a car shaped feature in a traffic lane has a low probability of being a fixed feature as it is moving. A tree or street sign shaped feature well out of the lane of traffic has a higher probability of being a fixed feature. Landmark features are features that have been mapped and have a high probability of being stationary. Examples are street signs (e.g., stop signs), light posts, tree trunks, and buildings. An example of a poor choice for a landmark feature is a parked car, which may move.

Structured map data preferably has high-accuracy location data for stationary objects that are generally on or near a roadway, often for use by an autonomous or semi-autonomous vehicle to navigate and determine its position.

In one embodiment, a process of generating the raw sensor data is performed with a camera array comprising at least two cameras that have been calibrated using a known scene. For example, the cameras might have been mounted in a housing that is to be attached to a vehicle, with the cameras having a relatively fixed position and orientation relative to each other once they are mounted. An array of cameras can be mounted in an array mount that rigidly supports the cameras. The array mount may be mounted in various places in a vehicle, for example above the rear view mirror, in front of the vehicle (e.g., on the bumper). An array may also be rear facing or side facing. An array may be mounted on top of the vehicle, exterior to the passenger compartment.

If the housing is placed with a known scene within the view of the cameras, such as a scene having fiducials, markings, references, and/or the like placed at specific positions with predetermined distances between the items, calibration can occur. By processing the imagery from the cameras, a calibration processor can determine how the views from the different cameras differ and this information can be stored in computer memory as calibration data to be used later to interpret camera outputs.

Vehicle-mounted cameras may be calibrated using internal calibration, extrinsic calibration, and/or automatic calibration. Internal calibration calibrates one camera or model of camera. Internal calibration may be accomplished by taking an image or video of a known scene and calculating the parameters of the camera from the resulting image or video. Extrinsic calibration refers to the calibration of an array of cameras. The cameras may be mounted in a rigid mount providing fixed positions of the cameras with respect to each other. An image or video of a known scene may be taken to calibrate the cameras with respect to each other as described above. Automatic calibration refers to continuous calibration that occurs when the image data from the array of cameras mounted in a vehicle is received and processed. The images or video from each camera may be compared to each other and to previous images from either the same array of cameras or other arrays of cameras to calibrate the cameras to account for movement in the array and the array's mounting within the vehicle.

The video data from each camera may be synchronized by, for example, a GPS pulse. The video from each camera may also be labeled with timestamps from GPS data or another time source. To enable processing of the data and ensure that features in a path are adequately covered, a vehicle may drive a route that covers the same path multiple times, allowing multiple images of the same scene to be taken. This addresses occlusion by other vehicles or optical problems such as lens flare. It also allows assessing loop closure error, described in more detail below. Vehicle location data and vehicle motion data are saved on the vehicle or transmitted to be processed.

Prior to the vehicle driving or otherwise maneuvering the route, the route is generated. The route may be generated to facilitate having multiple views of the same scene, for example by having the route cover the same path within the route multiple times. These paths may cross themselves, closing a loop. The route might be provided to a driver assigned to capture sensor data along the route.

A vehicle route is a route given to a vehicle operator to drive or otherwise conduct the vehicle through. A route might include one or more smaller segments, or paths. As an example, a driver might be assigned a route comprising four paths, each comprising the same lap around a city block. A computational system can then compare the four paths to fill in any portions of that were missed during one of the laps around the block, due to, for example, occlusion by delivery trucks.

During the driving of the route, the raw sensor data may be stored, for example, on a hard drive (e.g., solid state or flash drive). The data may be uploaded during the driving of the route by cellular transmission or transferred after driving the route when a Wi-Fi or physical LAN connection is available. The data may also be transferred to a hard drive, flash, or other portable storage media which may then be delivered to a facility having a sensor data processing system for processing.

Once the data has been received, the sensor data processing system performs a process similar to simultaneous localization and mapping (SLAM) on the data to produce structured map data. The sensor data processing system may process the data in real-time on the vehicle or process stored data after the vehicle has completed driving a route.

Close to the beginning of a route, an initial position of the vehicle is identified in a three-dimensional coordinate system such as (latitude, longitude, altitude) or (x, y, z). An initial orientation (roll, pitch, yaw) may also be identified. The initial position may be determined, for example, from GPS data, by comparing video from the current video data to historical map data, from cellular position data, or from another position source. The initial orientation may be determined from accelerometer and gyro data, by comparing video from the current video to historical data, or from another source. From the starting point, vehicle motion sensor data may be used to dead reckon an inferred position that the vehicle moved to. The camera data is then used to identify features and, from the change in position of the cameras with respect to the features, the dead reckoned position from the motion sensors is updated. The process is repeated to generate a series of corrected positions along a vehicle path. The process of dead reckoning is sometimes referred to as odometry.

Advantageously, vehicle routes may be designed to pass through the same location so the path will approximately overlap itself and thus forming a loop closure. At that point, a loop closure error may be calculated.

While vehicle motion sensors can generate vehicle motion data, these sensors do not directly provide position. The data can, however, be processed to determine a position. For example, speed readings can be integrated to provide a position, and inertial data from an accelerometer can be integrated twice to provide position. Such processing can compound errors in measurement.

An intersection of a path with itself may be observed when two points are observed to be a distance from each other that is less than a maximum loop closure distance. To avoid detecting points that are close in time, such as sequential observations, as forming a loop, a minimum amount of time (smallest loop time) or distance (smallest loop distance) covered may be required before detecting a loop closure. From the loop closure error, errors in the raw motion sensors may be calculated and correction applied throughout the path. If the route includes multiple trips through the same path, the data from multiple trips through the paths may be consolidated to correct the paths with respect to each other. Landmark features which did not change between repeated visits to the same path may be identified. Road features (e.g., curbs, road signs, other stationary objects) may be identified and annotated to produce structured map data.

Once the structured map data from a route is produced, it may be compared with historical data to eliminate features that are not stationary (e.g., parked cars that were stationary during the driven route but may move) and to update the historical map. For example, street signs may be added or removed, and construction may modify a roadway permanently.

The updated historical map data may then be stored in a canonical form that may then be translated into data formats that are adapted for proprietary map systems.

EMBODIMENTS

In one embodiment, intrinsically calibrated cameras are mounted in an array of cameras that are extrinsically calibrated within the array. The array mounted cameras capture video as the vehicle proceeds along the route.

The cameras may be synchronized using the GPS signal. Though the GPS signal itself is not generally accurate enough to provide high enough accuracy for vehicle navigation, the GPS time signal is sufficiently accurate to allow different images or video data to be synchronized, for example to mark video data with a time stamp to allow different video feeds to be processed such that images that were taken roughly simultaneously may be processed as such.

Vehicle motion sensors simultaneously record motion data. The vehicle motion sensors may be mounted in the mount which contains that camera array or may be in a separate device. The sensor data may also be derived from another device, such as a cellular telephone. In one embodiment, an inertial measurement unit (IMU) which includes an accelerometer, gyroscope, and GPS is mounted in the camera array mount, and this unit's GPS signal is used to synchronize the cameras as well as time stamp all vehicle sensor data. The GPS time stamp of all sensor and video data assists the sensor data processing system in correlating the video data and sensor data during processing, fusing the video data with the sensor data to form fused data.

In one embodiment, there may be multiple mounts which are triggered either by individual GPS signals or by a shared GPS signal.

The route that the vehicle proceeds on may, in one embodiment, be chosen to repeat one or more paths multiple times, forming at least one closed loop, which may be repeatedly driven.

The data may be uploaded to a data store either during collection (by, for example, cellular data) or may be stored on the vehicle and uploaded later when a LAN connection or Wi-Fi connection is available. Alternatively, the data may be delivered physically, when the vehicle parks at a collection facility or by transporting a hard drive or flash drive to a collection facility.

Once the data is received, the sensor data is processed to "dead reckon" the vehicle's position. An initial position $P_0$ (at a time to) may be derived by using the GPS signal, comparing video with historical map data, or by other means. From this initial position, a new position $P_1$ (at a time $t_1$) of the vehicle may be derived using vehicle movement data. For example, distance may be computed by integrating acceleration twice. The vehicle's initial speed may be calculated by choosing an initial position when the vehicle was stopped, by using GPS data to compute the vehicle's initial speed, by using video data to calculate the vehicle's initial speed, or by using the vehicle's on-board diagnostics to determine the vehicle's speed. Changes in direction may be determined by combining gyroscopic data with accelerometer data. Data from a magnetic compass may also be used. Combining this data produces the new position $P_1$ of the vehicle, with some error factor. This new position $P_1$ can then be checked and corrected using the video data. Features are identified in the video data that appear to be stationary at $P_0$. At time $t_1$, the alignment of those features can be used to determine what the new position of the vehicle is. Because there are at least two cameras, the parallax difference between camera views of the same feature can be used to determine its distance, and two different views of the same feature allow the change in position of the vehicle to be determined and compared with the position calculated based on the vehicle motion data. In this way, the sensor data processing system updates the position calculated from fused data based on the relative movement of features in the video data, wherein the fused data is derived from the sensor data to create accurate position data for the vehicle and the features. As the sensor data processing system corrects the position data, it detects biases in the sensor data and corrects them using the updated position data. As the video data is processed, possible features may be detected by edge detection or other computer vision techniques.

In one embodiment, vehicle motion data comprising inertial data is used to produce raw position data, such as a raw position for $P_1$. After the raw position $P_1$ is calculated, it is corrected (updated) using video data. The inertial data may rely primarily on data produced by a gyroscope and accelerometer. This data may come from an IMU.

Note that position data may include trajectory data, such as roll, pitch, and yaw or a velocity in an x, y, z or other coordinate system, as well as a position in space in an x, y, z coordinate or other coordinate system.

The process of calculating position from sensor data and correcting it from video data is repeated along the path, possibly for multiple times for each second of video data, for example at a frame rate in frames per second (FPS) of the video cameras (e.g., 24 FPS).

Advantageously, routes are determined to include closed paths. When the sensor data processing system determines that a vehicle has passed crossed the vehicle's path (has reached the same position twice), the sensor data processing system may determine a loop closure error, for example by matching GPS coordinates to a previous GPS coordinate, by matching video scenes, by matching orientation to known features, or by another map-matching technique. Once a loop closure has been detected, the cumulative error in the calculated position is known and can be corrected for by updating previous positions such that, at the loop closure, the position calculated at the end of the path is substantially the same as that of the beginning of the path. This allows for reducing trajectory drift. The trajectory drift correction can be computed and any bias in the sensors applied to future sensor data. In one embodiment, the loop closure error is calculated based on differences in position calculated from video data. This may be accomplished by comparing images from the first pass through the loop with images from the second pass through the loop, using features and parallax.

Advantageously, routes may be given to drivers to have multiple loop closures and multiple revisitations to the same portion of a path. Different paths forming different loops may share an overlapping segment of each path.

In one embodiment, the distance between two cameras in a camera array is approximately 50 cm, which provides some accuracy in locating objects closer than approximately 20 m. The movement of the vehicle enhances locating objects, such that as a feature is detected at a distance, there is a large uncertainty of its distance and precise location, but as the feature is repeatedly detected in sequential video frames, its distance and location becomes more and more certain, particularly as the vehicle gets closer to an object. That is, the point cloud of possible locations of an object corresponding to a feature shrinks as the feature is repeatedly detected from different locations and particularly as the vehicle gets closer to and passes the object. Note that, even though a faster moving vehicle may have fewer frames of images taken of a feature, the resulting point cloud may be just as accurate of an estimation of an object's location because the main determinant of location accuracy of objects is the change in position. In an extreme case, a stationary vehicle does not provide much improved location information about features in the images. For this reason, in one embodiment, the video stream may stop when it is detected that the vehicle is stationary and then restart once the vehicle is moving.

Map Merging

Once the map is created from the route, a map merging system may merge the map with historical maps. The map may be stored in a map database maintained by the server or onboard the vehicle. The historical maps may be stored on the server.

In one embodiment, the map merging system edits the newly created map to remove erroneous features, such as those that appear to be stationary in the new map but, based on historical data, are in fact transient. In another embodiment, the map merging system merges the newly created map with the historical map to create an updated historical map. In either case, the first step of analysis is change detection between the new map (most recent output from driving route) and the historical map. The map merging system can assign probabilities that changes are stationary vs. transient to changed features. Holes in either map can be filled. For example, a parked truck may have occluded portions of the new map. The parked truck is detected as having a high probability of being a transient feature that should be removed. After removing the feature, historical data from other maps fills in the hole created by removing the parked truck from the new map. In order to merge the newly created map with the historical map, the map merging system may precisely align the maps so that alignment errors are not treated as changes in features. For example, failure to align the maps properly could result in street signs appearing to move or grow.

FIG. 1 illustrates a method in accordance with one embodiment. At step 100, the method starts. In step 101, the vehicle sensor data is gathered as the vehicle drives the route. The data is stored on a hard drive or other storage device on the vehicle. At step 102, the data is uploaded to the data processing system. At step 103, the sensor data processing system generates structured map data from the vehicle sensor data. At step 104, the data is stored in a canonical form. At step 105, the method ends.

Figure 2:
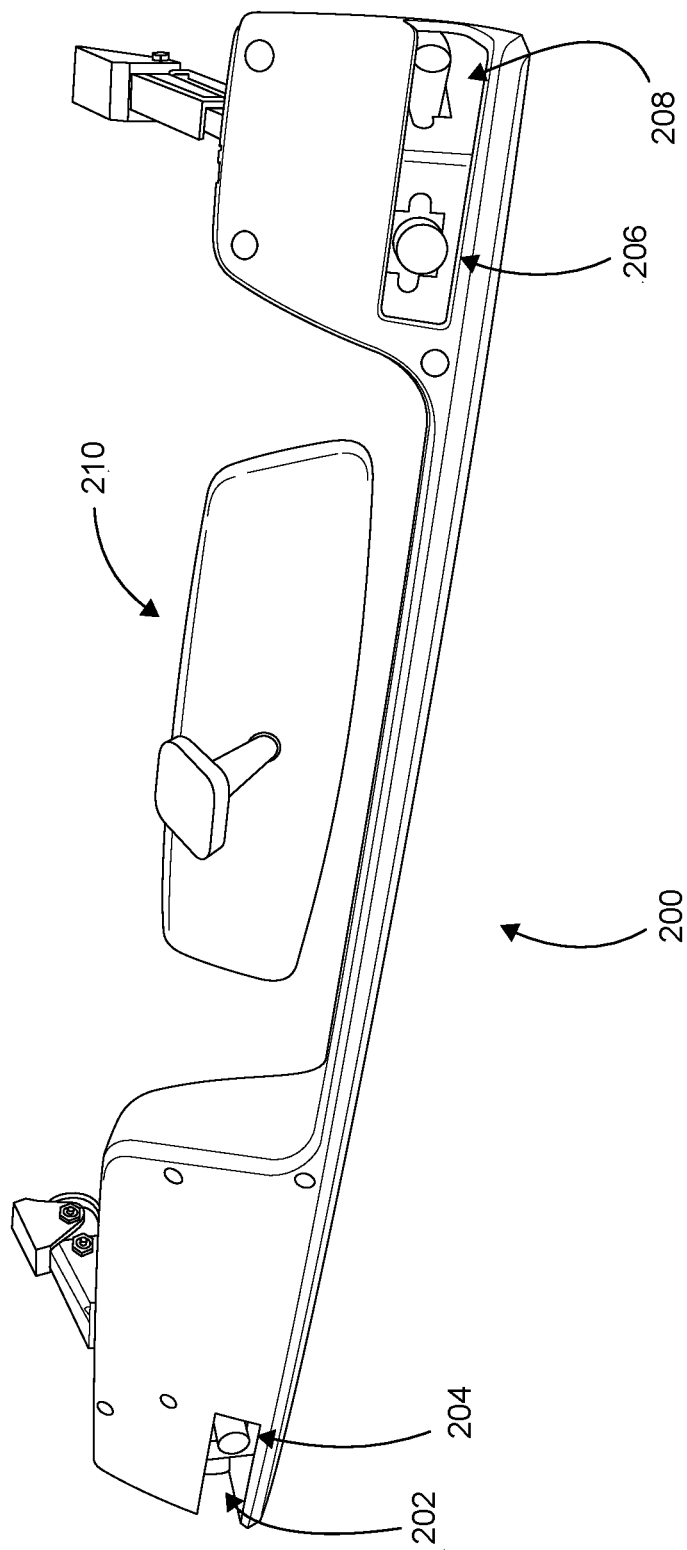
FIG. 2 shows a mount for an array of cameras.

FIG. 2 illustrates a camera array mount 200 in accordance with one embodiment. The camera array mount includes four cameras 202, 204, 206, and 208 mounted internally to the camera array mount. The camera mounted array is mounted in a vehicle, such as an automobile, in the passenger compartment near the front windshield and surrounds the rearview mirror 210.

Exemplary System

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 3:
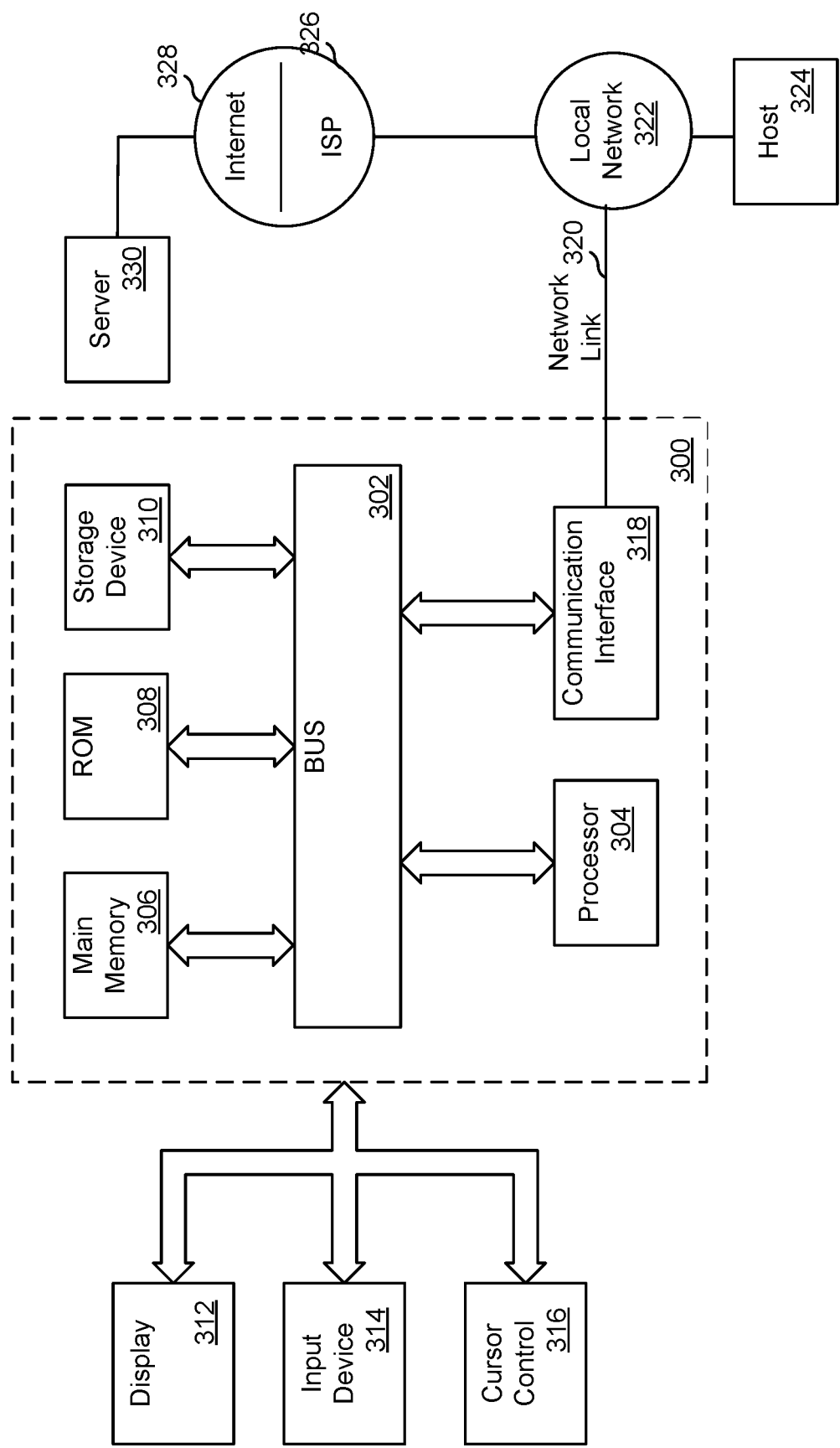
FIG. 3 shows an exemplary computing system.

For example, FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a computer monitor, for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a network connection. A modem or network interface local to computer system 300 can receive the data. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A method of generating structured map data comprising:
   receiving time-stamped sensor data from at least one sensor mounted on a vehicle; receiving time-stamped video data comprising at least two video streams, each video stream produced by a camera of at least two cameras mounted on the vehicle;
   from the time-stamped sensor data, computing a plurality of spatial reading values, each spatial reading value comprising a position and an associated time stamp, such that the position indicates a position at which the at least one sensor was deemed to be during a time indicated by the associated timestamp, the plurality of spatial reading values including a first spatial reading value, comprising a position p0 and a time t0, and a second spatial reading value, comprising a position p1 and a time t1;
   from the time-stamped video data, computing a plurality of image records for each of the at least two video streams, each image record comprising an image and an associated time stamp, such that the image is deemed t0 have been recorded at the associated time stamp;
   using a processor, identifying at least two t0 image records, each t0 image record selected from one of the plurality of image records for each of the at least two video streams, such that each image record of the at least two t0 image records has an associated time stamp approximately equal to t0;
   using a processor, identifying at least two t1 image records, each t1 image record selected from one of the plurality of image records for each of the at least two video streams, such that each image record of the at least two t1 image records has an associated time stamp approximately equal to t1;
   using a processor, identifying a fixed feature present in each of the at least two t0 image records and in the at least two t1 image records;
   calculating a t0 relative feature position of the fixed feature at time t0 based on a parallax difference between the at least two t0 image records;
   calculating a t1 relative feature position of the fixed feature at time t1 based on a parallax difference between the at least two t1 image records;
   based on a difference between the t0 relative feature position and the t1 relative feature position, determine an adjustment to p1.

2. The method of claim 1, further comprising:
   using a processor, identifying a plurality of fixed features in the image records;
   for each of the plurality of fixed features, calculating at least one relative feature position of the fixed feature based on at least two image records to produce a plurality of relative features positions;
   producing a plurality of adjustments by determining an adjustment to the position of each spatial reading value of the plurality of spatial reading values based on the plurality of relative feature positions;
   applying the plurality of adjustments to the position of each spatial reading value of the plurality of spatial reading values to produce a plurality of adjusted spatial reading values;
   detecting a later position of the plurality of adjusted spatial reading values is within a maximum loop closure distance of a prior position of the plurality of adjusted spatial reading values, the later position and prior position separated by one of a smallest loop time and a smallest loop distance, the later position associated with a later time stamp and the prior position associated with a prior time stamp; and
   calculating a loop closure error from a first image record, of the plurality of image records, having an associated time stamp approximately equal to the prior time stamp and a second image record having an associated time stamp approximately equal to the later time stamp.

3. The method of claim 1, wherein the time-stamped sensor data comprises data from an accelerometer mounted in the vehicle and a time stamp is applied to the sensor data using a timing signal from a Global Positioning System.

4. The method of claim 2, wherein the loop closure error is used to calculate a further adjustment to the plurality of adjusted spatial reading values.

5. The method of claim 3, wherein the at least two cameras are mounted in a camera array mounted on the vehicle.

6. A method of generating structured map data, comprising:
   receiving time-stamped sensor data from at least one sensor mounted on a vehicle;
   receiving time-stamped video data comprising at least two video streams, each video stream produced by a camera of at least two cameras mounted on the vehicle;
   from the time-stamped sensor data, computing a plurality of spatial reading values, each spatial reading value comprising a position and an associated time stamp, such that the position indicates a position at which the at least one sensor was deemed to be during a time indicated by the associated timestamp;
   from the time-stamped video data, computing a plurality of image records for each of the at least two video streams, each image record comprising an image and an associated time stamp, such that the image is deemed to have been recorded at the associated time stamp;

using a processor, identifying a plurality of feature image records associated with a feature, the plurality of feature image records being a subset of the plurality of image records such that each image in each image record contains the feature;

calculating a plurality of relative feature positions by calculating a relative feature position from each image in the plurality of feature image records; and producing a point cloud comprising a plurality of positions for the feature based on the plurality of relative feature positions.

7. The method of claim 6, wherein a probabilistic position of the feature is calculated from the point cloud, with an accuracy of the probabilistic position improving as more time-stamped video data containing the feature is collected.

8. The method of claim 6, further comprising:

using a processor, identifying at least two t0 image records, each t0 image record selected from one of the plurality of image records for each of the at least two video streams, such that each image record of the at least two t0 image records has an associated time stamp approximately equal to t0;

using a processor, identifying at least two t1 image records, each t1 image record selected from one of the plurality of image records for each of the at least two video streams, such that each image record of the at least two t1 image records has an associated time stamp approximately equal to t1;

using a processor, identifying a fixed feature present in each of the at least two t0 image records and in the at least two t1 image records;

calculating a t0 relative feature position of the fixed feature at time t0 based on a parallax difference between the at least two t0 image records;

calculating a t1 relative feature position of the fixed feature at time t1 based on a parallax difference between the at least two t1 image records;

based on a difference between the t0 relative feature position and the t1 relative feature position, determine an adjustment to p1.

9. The method of claim 7, wherein the probabilistic position of a feature is compared to historical map data to determine if the feature is stationary.

10. The method of claim 7, wherein the probabilistic position of the feature is used to update historical map data.

11. The method of claim 8, further comprising:

producing a plurality of adjustments by determining an adjustment to the position of each spatial reading value of the plurality of spatial reading values, the plurality of adjustments based on a plurality of relative feature positions of a plurality of fixed features identified, using a processor, in the image records;

applying the plurality of adjustments to the position of each spatial reading value of the plurality of spatial reading values to produce a plurality of adjusted spatial reading values;

detecting a later position of the plurality of adjusted spatial reading values is within a maximum loop closure distance of a prior position of the plurality of adjusted spatial reading values, the later position and prior position separated by one of a smallest loop time and a smallest loop distance; and calculating a loop closure error from the time stamped video data based on the later position, the time stamp associated with the later position, the prior position, and the time stamp of the prior position.

12. The method of claim 11, wherein the loop closure error is used to calculate an adjustment for at least one position in the point cloud.

13. The method of claim 11, wherein the time-stamped sensor data comprises data from Inertial Measurement Unit mounted in the vehicle and a time-stamp from a Global Positioning System mounted in the vehicle.

14. A system for generating structured map data comprising:

a vehicle having a time source, sensors which collect sensor data, and an array of at least two cameras each of which produce a video stream, wherein time stamps from the time source are applied to the sensor data to produce time-stamped sensor data and to each video stream to produce time-stamped video data; and a sensor data processing system which receives the time-stamped sensor data and time-stamped video data, the sensor data processing system performing the steps of:

(a) from the time-stamped sensor data, computing a plurality of spatial reading values, each spatial reading value comprising a position and an associated time stamp, such that the position indicates a position at which the at least one sensor was deemed to be during a time indicated by the associated time-stamp, the plurality of spatial reading values including a first spatial reading value, comprising a position p0 and a time t0, and a second spatial reading value, comprising a position p1 and a time t1;

(b) from the time-stamped video data, computing a plurality of image records for each of the at least two video streams, each image record comprising an image and an associated time stamp, such that the image is deemed t0 have been recorded at the associated time stamp;

(c) using a processor, identifying at least two t0 image records, each t0 image record selected from one of the plurality of image records for each of the at least two video streams, such that each image record of the at least two t0 image records has an associated time stamp approximately equal to t0;

(d) using the processor, identifying at least two t1 image records, each t1 image record selected from one of the plurality of image records for each of the at least two video streams, such that each image record of the at least two t1 image records has an associated time stamp approximately equal to t1;

(e) using the processor, identifying a fixed feature present in each of the at least two t0 image records and in the at least two t1 image records;

(f) calculating a t0 relative feature position of the fixed feature at time t0 based on a parallax difference between the at least two t0 image records;

(g) calculating a t1 relative feature position of the fixed feature at time t1 based on a parallax difference between the at least two t1 image records;

(h) based on a difference between the t0 relative feature position and the t1 relative feature position, determine an adjustment to p1.

15. The system of claim 14, wherein the sensor data processing further performs the steps of:

producing a plurality of adjustments by determining an adjustment t0 the position of each spatial reading value of the plurality of spatial reading values, the plurality of adjustments based on a plurality of relative feature positions of a plurality of fixed features identified, using the processor, in the image records;

applying the plurality of adjustments to the position of each spatial reading value of the plurality of spatial reading values to produce a plurality of adjusted spatial reading values;

detecting a later position of the plurality of adjusted spatial reading values is within a maximum loop closure distance of a prior position of the plurality of adjusted spatial reading values, the later position and prior position separated by one of a smallest loop time and a smallest loop distance; and calculating a loop closure error from the time stamped video data based on the later position, the time stamp associated with the later position, the prior position, and the time stamp of the prior position.

16. The system of claim 14, wherein the sensor data processing further performs the steps of:

using the processor, identifying a plurality of feature image records associated with a feature, the feature image records being a subset of the plurality of image records such that, for each time stamp in the feature image records, at least one image associated with the time stamp contains the feature; and calculating a plurality of relative feature positions by calculating a relative feature position from each image in the feature image records; and producing a point cloud comprising a plurality of positions for the feature based on the plurality of relative feature positions.

17. The system of claim 14, wherein the sensors which collect sensor data include an accelerometer and a gyroscope and the time source is a Global Positioning System.

18. The system of claim 15, wherein the loop closure error is used to calculate a further adjustment to the plurality of adjusted spatial reading values.

19. The system of claim 16, wherein a probabilistic position of the feature is calculated from the point cloud, with an accuracy of the probabilistic position improving as more time-stamped video data containing the feature is collected.

20. The system of claim 19, wherein the probabilistic position of a feature is compared to historical map data to determine if the feature is stationary.

* * * * *